(12) United States Patent
Mehta et al.

(10) Patent No.: US 12,105,502 B2
(45) Date of Patent: Oct. 1, 2024

(54) METHOD AND APPARATUS FOR CONTROLLING AN INDUSTRIAL GAS PLANT COMPLEX

(71) Applicant: Air Products and Chemicals, Inc., Allentown, PA (US)

(72) Inventors: Sanjay Mehta, Alburtis, PA (US); Pratik Misra, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 18/103,766

(22) Filed: Jan. 31, 2023

(65) Prior Publication Data

US 2023/0185283 A1 Jun. 15, 2023

Related U.S. Application Data

(63) Continuation of application No. 17/193,052, filed on Mar. 5, 2021, now Pat. No. 11,625,020.

(51) Int. Cl.
*G05B 19/4155* (2006.01)
(52) U.S. Cl.
CPC ............ *G05B 19/4155* (2013.01); *G05B 2219/32021* (2013.01); *G05B 2219/41108* (2013.01)
(58) Field of Classification Search
CPC ...... G05B 19/4155; G05B 2219/32021; G05B 2219/41108
See application file for complete search history.

(56) References Cited

U.S. PATENT DOCUMENTS

| 2006/0192435 A1 | 8/2006 | Parmley |
| 2007/0079611 A1 | 4/2007 | Doland |

(Continued)

FOREIGN PATENT DOCUMENTS

| CA | 3133043 A1 | 10/2020 |
| CN | 102693451 B | 11/2014 |

(Continued)

OTHER PUBLICATIONS

Beerbuhl, S. Schulte, Magnus Fröhling, and Frank Schultmann. "Combined scheduling and capacity planning of electricity-based ammonia production to integrate renewable energies." European Journal of Operational Research 241.3 (2015): 851-862 (Year: 2015).*

(Continued)

*Primary Examiner* — Christopher E. Everett
(74) *Attorney, Agent, or Firm* — Matthew R. Weaver

(57) ABSTRACT

There is provided a method of controlling an industrial gas plant complex comprising a plurality of industrial gas plants powered by one or more renewable power sources, the method being executed by at least one hardware processor, the method comprising receiving time-dependent predicted power data for a pre-determined future time period from the one or more renewable power sources; receiving time-dependent predicted operational characteristic data for each industrial gas plant; utilizing the predicted power data and predicted characteristic data in an optimization model to generate a set of state variables for the plurality of industrial gas plants; utilizing the generated state variables to generate a set of control set points for the plurality of industrial gas plants; and sending the control set points to a control system to control the industrial gas plant complex by adjusting one or more control set points of the industrial gas plants.

14 Claims, 6 Drawing Sheets

(56) References Cited

U.S. PATENT DOCUMENTS

| | | |
|---|---|---|
| 2007/0119718 A1 | 5/2007 | Gibson |
| 2010/0114395 A1 | 5/2010 | Hinatsu |
| 2011/0081586 A1 | 4/2011 | Mcalister |
| 2014/0025354 A1 | 1/2014 | Padullaparthi |
| 2015/0153714 A1 | 6/2015 | Ho |
| 2017/0122129 A1 | 5/2017 | Heid |
| 2019/0324432 A1 | 10/2019 | Cella |
| 2021/0405603 A1 | 12/2021 | Nagino |

FOREIGN PATENT DOCUMENTS

| | | |
|---|---|---|
| EP | 2688015 A1 | 1/2014 |
| WO | 2020203520 A1 | 10/2020 |

OTHER PUBLICATIONS

Serna, Alvaro, et al. "Predictive control for hydrogen production by electrolysis in an offshore platform using renewable energies." international journal of hydrogen energy 42.17 (2017): 12865-12876. (Year: 2017).*

Siddiqui O, Ishaq H, Chehade G, Dincer I. Performance investigation of a new renewable energy-based carbon dioxide capturing system with aqueous ammonia; Int J Energy Res. 2020;44:2252-2263; (12 pgs.) Nov. 30, 2019.

Guerra, C. Fúnez, et al; Technical-economic analysis for a green ammonia production plant in Chile and its subsequent transport to Japan; Renewable Energy 157 (2020) 404-414; (11 pgs.) May 9, 2020.

Palys, Matthew J. and Dautidis, Prodromos; "Using hydrogen and ammonia for renewable energy storage: A geographically comprehensive techno-economic study"; Computers and Chemical Engineering 136 (2020) 106785; (13 pgs.) Feb. 23, 2020.

Ishaq, H., Dincer, I.; Design and simulation of a new cascaded ammonia synthesis system driven by renewables; Sustainable Energy Technologies and Assessments 40 (2020) 100725; (14 pgs.) May 6, 2020.

Ozturk M, Dincer I., An integrated system for ammonia production from renewable hydrogen: A case study, International Journal of Hydrogen Energy; (8 pgs.) https://doi.org/10.1016/j.ijhydene.2019.12.127.

Nayak-Luke, Richard, et al; "Green" Ammonia: Impact of Renewable Energy Intermittency on Plant Sizing and Levelized Cost of Ammonia; (10 pgs.) Ind. Eng. Chem. Res. 2018, 57, 14607-14616.

Mert Ilker Ed, Kurt Erol, et al; "Agnostic deep neural network approach to the estimation of hydrogen production for solar-powered systems", International Journal of Hydrogen Energy, Elsevier, Amsterdam, NL, vol. 46, No. 9, Dec. 9, 2020, 14 pgs.

Haider Syed Altan, et al: "Forecasting hydrogen production potential in Islamabad from solar energy using water electrolysis", International Journal of Hydrogen Energy, Elsevier, Amsterdam, NL, vol. 46, No. 2, Nov. 3, 2020, 11 pgs.

* cited by examiner

METHOD AND APPARATUS FOR CONTROLLING AN INDUSTRIAL GAS PLANT COMPLEX

CROSS-REFERENCE TO RELATED APPLICATIONS

The present application is a continuation application of U.S. Patent Application No. 17/193,052, which was filed on Mar. 5, 2021.

TECHNICAL FIELD

The present invention relates to a method and system for controlling an industrial gas plant complex comprising a plurality of industrial gas plants powered by one or more renewable power sources.

BACKGROUND

An industrial gas plant complex may comprise one or more process plants which produce, or are involved in the production of, gases. In non-limiting examples, these gases may comprise: industrial gases, commercial gases, medical gases, inorganic gases, organic gases, fuel gases and green fuel gases either in gaseous, liquified or compressed form.

There is considerable interest in methods and systems for utilising renewable energy sources for powering industrial gas plants and industrial gas plant complexes. However, a significant drawback of the use of renewable energy sources such as wind, solar and tidal power is the natural variability and transient nature of such energy sources.

In general, a constant or substantially constant power supply is preferred for an industrial gas plant or industrial gas plant complex. Therefore, the variable and intermittent nature of wind, solar and/or tidal power is problematic and renders it difficult to ensure maximum utilisation of an industrial gas plant or industrial gas plant complex utilizing such power sources.

An exemplary industrial gas is Ammonia. Ammonia is produced using Hydrogen from water electrolysis and nitrogen separated from the air. These gases are then fed into the Haber-Bosch process, where Hydrogen and Nitrogen are reacted together at high temperatures and pressures to produce ammonia.

There is considerable interest in the production of Ammonia using renewable energy. This is known as green Ammonia. However, Ammonia synthesis can be particularly sensitive to the variation in input energy from renewable sources. Thus, solutions to these technical problems are required to enable industrial gases to be produced efficiently in such arrangements.

BRIEF SUMMARY OF THE INVENTION

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

According to a first aspect, there is provided a method of determining and utilizing predicted available power resources from one or more renewable power sources for one or more industrial gas plants comprising one or more storage resources, the method executed by at least one hardware processor, the method comprising: obtaining historical time-dependent environmental data associated with the one or more renewable power sources; obtaining historical time-dependent operational characteristic data associated with the one or more renewable power sources; training a machine learning model based on the historical time-dependent environmental data and the historical time-dependent operational characteristic data; executing the trained machine learning model to predict available power resources for the one or more industrial gas plants for a pre-determined future time period; and controlling the one or more industrial gas plants in response to the predicted available power resources for the pre-determined future time period.

In embodiments, controlling the one or more industrial gas plants comprises maximizing the usage of the predicted available power resources for the pre-determined future time period.

In embodiments, the storage resources comprise one or more industrial gas storage vessels and/or one or more energy storage resources.

In embodiments, the one or more energy storage resources comprises one or more of: battery energy storage systems; compressed air energy storage; liquid air energy storage; or pumped hydroelectric energy storage.

In embodiments, maximizing the usage of the predicted power resources further comprises controlling the utilization of the industrial gas storage vessels and/or one or more energy storage resources in response to the predicted available power resources.

In embodiments, controlling the utilization comprises utilizing an algorithm to select one or more storage resources from a group of storage resources for a given pattern of predicted power availability as a function of time.

In embodiments, selection of storage resources is based on physical characteristics of the storage resources.

In embodiments, the one or more renewable power sources comprise one or more of: solar power sources; wind power sources; tidal; hydro power; or geothermal power sources.

In embodiments, the environmental data is selected from one or more of: wind speed; cloud cover; precipitation; humidity; air temperature; atmospheric pressure; solar intensity; and tide times.

In embodiments, the operational characteristic data comprises power output from the one or more renewable power sources.

In embodiments, the step of training the machine learning model is carried out periodically at a pre-determined training time.

In embodiments, at the training time the machine learning model is trained based on historical time-dependent environmental data and the historical time-dependent operational characteristic data obtained within one or more pre-determined historical time windows.

In embodiments, the method further comprises comparing the value of the predicted power resources for a pre-determined future time period with the actual power resources at the end of the predicted period to generate a prediction error value.

In embodiments, the pre-determined training time is selected when the prediction error value exceeds a pre-determined threshold.

In embodiments, the pre-determined training time is selected based on a pre-determined empirical interval unless the prediction error value exceeds the pre-determined threshold within the pre-determined empirical interval.

In embodiments, the one or more industrial gas plants comprise a Hydrogen production plant comprising at least one electrolyzer.

In embodiments, the one or more industrial gas plants comprise an Ammonia production plant complex including the Hydrogen production plant.

In embodiments, the machine learning model comprises one or more of: Gradient boosting algorithm; Long short-term memory (LSTM) algorithm; support vector machine (SVM) algorithm; or random decision forest algorithm.

According to a second aspect, there is provided a system for determining and utilizing predicted available power resources from one or more renewable power sources for one or more industrial gas plants comprising one or more storage resources, the system comprising: at least one hardware processor operable to perform: obtaining historical time-dependent environmental data associated with the one or more renewable power sources; obtaining historical time-dependent operational characteristic data associated with the one or more renewable power sources; training a machine learning model based on the historical time-dependent environmental data and the historical time-dependent operational characteristic data; executing the trained machine learning model to predict available power resources for the one or more industrial gas plants for a pre-determined future time period; and controlling the one or more industrial gas plants in response to the predicted available power resources for the pre-determined future time period.

According to a third aspect, there is provided a computer readable storage medium storing a program of instructions executable by a machine to perform a method of determining and utilizing predicted available power resources from one or more renewable power sources for one or more industrial gas plants comprising one or more storage resources, the method comprising: obtaining historical time-dependent environmental data associated with the one or more renewable power sources; obtaining historical time-dependent operational characteristic data associated with the one or more renewable power sources; training a machine learning model based on the historical time-dependent environmental data and the historical time-dependent operational characteristic data; executing the trained machine learning model to predict available power resources for the industrial gas plant for a pre-determined future time period; and controlling the one or more industrial gas plants in response to the predicted available power resources for the pre-determined future time period.

According to a fourth aspect, there is provided a method of monitoring operational characteristics of an industrial gas plant complex comprising a plurality of industrial gas plants, the method being executed by at least one hardware processor, the method comprising: assigning a machine learning model to each of the industrial gas plants forming the industrial gas plant complex; training the respective machine learning model for each industrial gas plant based on received historical time-dependent operational characteristic data for the respective industrial gas plant; executing the trained machine learning model for each industrial gas plant to predict operational characteristics for each respective industrial gas plant for a pre-determined future time period; and comparing predicted operational characteristic data for each respective industrial gas plant for a pre-determined future time period with measured operational characteristic data for the corresponding time period to identify deviations in industrial gas plant performance.

In embodiments, the step of comparing is carried out at the end of the pre-determined future time period of the predicted operational characteristic data or at a timestamp therein.

In embodiments, the step of comparing comprises comparing predicted operational characteristic data predicted for a pre-determined time window with actual measured operational characteristic data for the same time window.

In embodiments, the received historical time-dependent operational characteristic data for the respective industrial gas plant comprises data obtained from a direct measurement of a process or parameter of the respective industrial gas plant.

In embodiments, the received historical time-dependent operational characteristic data for the respective industrial gas plant comprises data obtained from a physics-based model representative of operational characteristics of the respective industrial gas plant.

In embodiments, measured data relating to a process or parameter of the respective industrial gas plant is input into the respective physics-based model.

In embodiments, the predicted operational characteristics for each industrial gas plant are utilized to determine predicted future resources, future failure and/or predicted future maintenance.

In embodiments, one or more of the industrial gas plants comprises a hydrogen process plant having a plurality of electrolyzer modules.

In embodiments, each of the electrolyzer modules is assigned a machine learning model.

In embodiments, the predicted operational characteristics for each respective industrial gas plant are utilized in a further model to generate an operational performance metric of the industrial gas plant complex.

In embodiments, the operational performance metric comprises an efficiency value for the industrial gas plant complex.

In embodiments, the industrial gas plant complex comprises an Ammonia plant complex and the determined efficiency value enables a predicted determination of the Ammonia produced for a given level of energy input.

According to a fifth aspect, there is provided a system for monitoring operational characteristics of an industrial gas plant complex comprising a plurality of industrial gas plants, the system comprising at least one hardware processor operable to perform assigning a machine learning model to each of the industrial gas plants forming the industrial gas plant complex; training the respective machine learning model for each industrial gas plant based on received historical time-dependent operational characteristic data for the respective industrial gas plant; executing the trained machine learning model for each industrial gas plant to predict operational characteristics for each respective industrial gas plant for a pre-determined future time period; and comparing predicted operational characteristic data for each respective industrial gas plant for a pre-determined future time period with measured operational characteristic data for the corresponding time period to identify deviations in industrial gas plant performance.

In embodiments, the step of comparing is carried out at the end of the pre-determined future time period of the predicted operational characteristic data or at a timestamp therein.

In embodiments, the step of comparing comprises comparing predicted operational characteristic data predicted for a pre-determined time window with actual measured operational characteristic data for the same time window.

In embodiments, the received historical time-dependent operational characteristic data for the respective industrial gas plant comprises data obtained from a direct measurement of a process or parameter of the respective industrial gas plant.

In embodiments, the received historical time-dependent operational characteristic data for the respective industrial gas plant comprises data obtained from a physics-based model representative of operational characteristics of the respective industrial gas plant.

In embodiments, the predicted operational characteristics for each industrial gas plant are utilized to determine predicted future resources, future failure and/or predicted future maintenance.

In embodiments, the predicted operational characteristics for each respective industrial gas plant are utilized in a further model to generate an operational performance metric of the industrial gas plant complex.

According to a sixth aspect, there is provided a computer readable storage medium storing a program of instructions executable by a machine to perform a method of monitoring operational characteristics of an industrial gas plant complex comprising a plurality of industrial gas plants, the method being executed by at least one hardware processor, the method comprising: assigning a machine learning model to each of the industrial gas plants forming the industrial gas plant complex; training the respective machine learning model for each industrial gas plant based on received historical time-dependent operational characteristic data for the respective industrial gas plant; executing the trained machine learning model for each industrial gas plant to predict operational characteristics for each respective industrial gas plant for a pre-determined future time period; and comparing predicted operational characteristic data for each respective industrial gas plant for a pre-determined future time period with measured operational characteristic data for the corresponding time period to identify deviations in industrial gas plant performance.

According to a seventh aspect, there is provided a method of controlling an industrial gas plant complex comprising a plurality of industrial gas plants powered by one or more renewable power sources, the method being executed by at least one hardware processor, the method comprising: receiving time-dependent predicted power data for a pre-determined future time period from the one or more renewable power sources; receiving time-dependent predicted operational characteristic data for each industrial gas plant; utilizing the predicted power data and predicted characteristic data in an optimization model to generate a set of state variables for the plurality of industrial gas plants; utilizing the generated state variables to generate a set of control set points for the plurality of industrial gas plants; and sending the control set points to a control system to control the industrial gas plant complex by adjusting one or more control set points of the industrial gas plants.

In embodiments, the optimization model defines the predicted power data and predicted characteristic data as a set of non-linear equations.

In embodiments, the state variables are generated by solving the set of non-linear equations.

In embodiments, the time-dependent predicted power data is generated from a trained machine learning model.

In embodiments, the time-dependent predicted power data is obtained by: obtaining historical time-dependent environmental data associated with the one or more renewable power sources; obtaining historical time-dependent operational characteristic data associated with the one or more renewable power sources; training a machine learning model based on the historical time-dependent environmental data and the historical time-dependent operational characteristic data; and executing the trained machine learning model to predict available power resources for the one or more industrial gas plants for a pre-determined future time period.

In embodiments, the time-dependent predicted operational characteristic data is generated from a trained machine learning model for each of the industrial gas plants.

In embodiments, the time-dependent predicted operational characteristic data for each industrial plant is obtained by: assigning a machine learning model to each of the industrial gas plants forming the industrial gas plant complex; training the respective machine learning model for each industrial gas plant based on received historical time-dependent operational characteristic data for the respective industrial gas plant; and executing the trained machine learning model for each industrial gas plant to predict operational characteristics for each respective industrial gas plant for a pre-determined future time period.

In embodiments, the industrial gas plant complex comprises storage resources comprising one or more industrial gas storage vessels and/or one or more energy storage resources.

In embodiments, the one or more energy storage resources comprises one or more of: battery energy storage systems; compressed air energy storage; liquid air energy storage; or pumped hydroelectric energy storage.

In embodiments, the predicted power data further comprises data representative of operational parameters of the storage resources.

In embodiments, the data representative of operational parameters of the storage resources comprises one or more of: resource storage availability; fill level; and utilization.

According to an eighth aspect, there is provided a system for controlling an industrial gas plant complex comprising a plurality of industrial gas plants powered by one or more renewable power sources, the system comprising: at least one hardware processor operable to perform: receiving time-dependent predicted power data for a pre-determined future time period from the one or more renewable power sources; receiving time-dependent predicted operational characteristic data for each industrial gas plant; utilizing the predicted power data and predicted characteristic data in an optimization model to generate a set of state variables for the plurality of industrial gas plants; utilizing the generated state variables to generate a set of control set points for the plurality of industrial gas plants; and sending the control set points to a control system to control the industrial gas plant complex by adjusting one or more control set points of the industrial gas plants.

In embodiments, the optimization model defines the predicted power data and predicted characteristic data as a set of non-linear equations.

In embodiments, the state variables are generated by solving the set of non-linear equations.

In embodiments, the time-dependent predicted power data is generated from a trained machine learning model.

In embodiments, the time-dependent predicted operational characteristic data is generated from a trained machine learning model for each of the industrial gas plants.

According to a ninth aspect, there is provided a computer readable storage medium storing a program of instructions executable by a machine to perform a of controlling an industrial gas plant complex comprising a plurality of industrial gas plants powered by one or more renewable power sources, the method being executed by at least one hardware processor, the method comprising: receiving time-dependent predicted power data for a pre-determined future time period from the one or more renewable power sources; receiving time-dependent predicted operational characteristic data for each industrial gas plant; utilizing the predicted power data and predicted characteristic data in an optimization model to generate a set of state variables for the plurality of industrial gas plants; utilizing the generated state variables to generate a set of control set points for the plurality of industrial gas plants; and sending the control set points to a control system to control the industrial gas plant complex by adjusting one or more control set points of the industrial gas plants.

In embodiments, the optimization model defines the predicted power data and predicted characteristic data as a set of non-linear equations.

In embodiments, the state variables are generated by solving the set of non-linear equations.

In embodiments, the time-dependent predicted power data is generated from a trained machine learning model and/or the time-dependent predicted operational characteristic data is generated from a trained machine learning model for each of the industrial gas plants.

BRIEF DESCRIPTION OF THE DRAWINGS

Embodiments of the present invention will now be described by example only and with reference to the figures in which.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Figure 1:
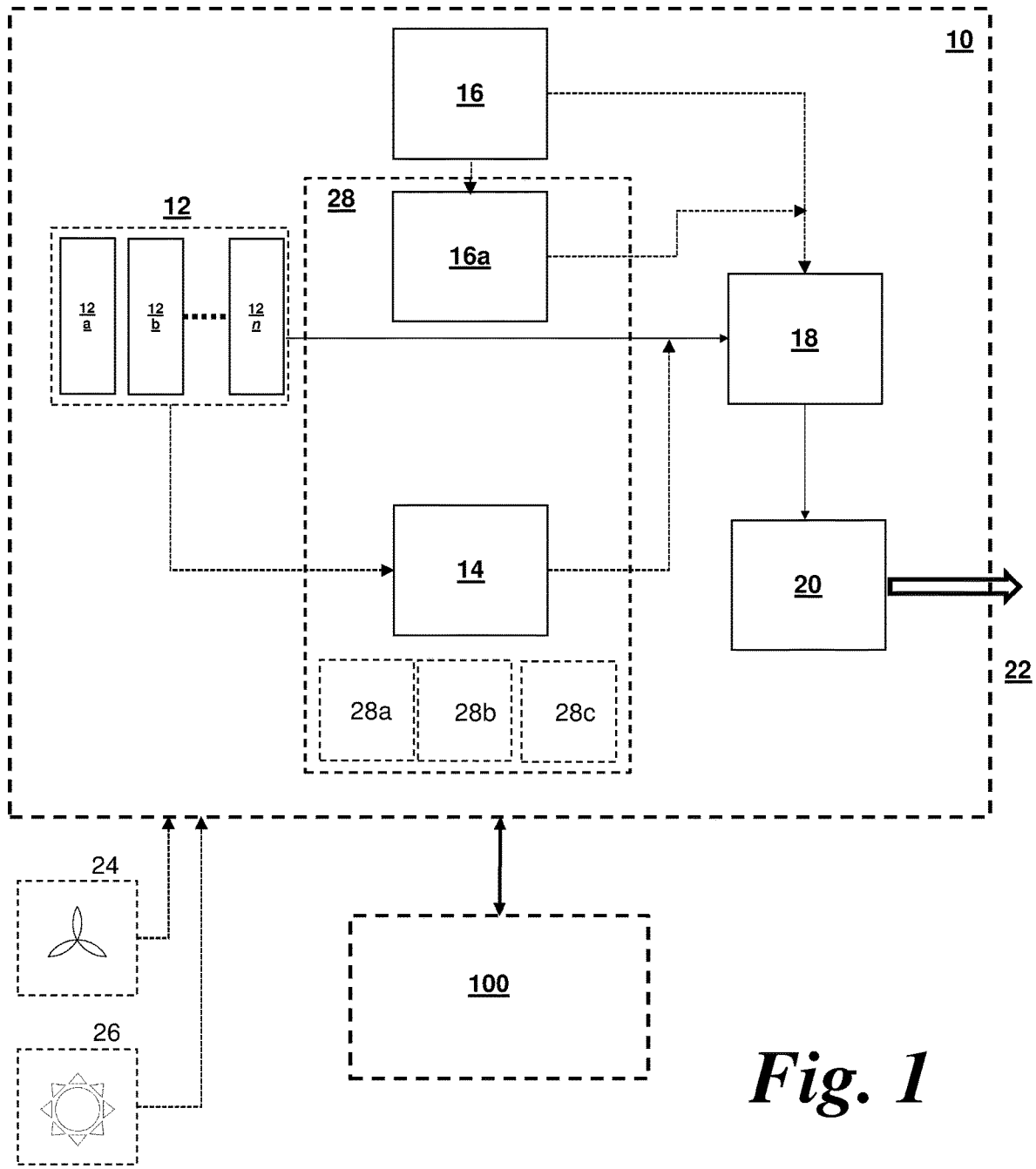
FIG. 1 is a schematic diagram of an industrial gas plant complex and control system.

FIG. 1 shows a schematic diagram of an industrial gas plant complex 10 and a control system 100.

The industrial gas plant complex 10 comprises a Hydrogen production plant 12, a Hydrogen storage unit 14, an Air Separation Unit (ASU) 16, an Ammonia synthesis plant 18 and an ammonia storage unit 20. The ammonia storage unit 20 is connected to an external supply chain 22 for onward distribution of Ammonia.

Electricity for powering the industrial gas plant complex 10 is generated at least in part by renewable energy sources such as wind 24 and/or the solar 26 although other sources such as a diesel-, petrol- or hydrogen-powered generator (not shown) or a national power grid (not shown) may optionally be utilised.

To address the intermittency of power supply from renewable sources, a storage resource 28 is provided. The storage resource 28 may comprise one or more resource storage devices or energy storage devices. For example, the one or more resource storage devices may include the Hydrogen storage unit 14. Hydrogen production through electrolysis requires a significant amount of power and the use of stored Hydrogen as a Hydrogen source for Ammonia production may significantly reduce the power consumption of the plant 10 during periods of low renewable power supply. Additionally, liquid Nitrogen storage 16a may also be provided as part of the storage resource 28 as shown in FIG. 1.

Additionally or alternatively, in non-exhaustive arrangements, the energy storage devices may comprise one or more of: a Battery Energy Storage System (BESS) 28a, a Compressed/Liquid Air Energy Systems (CAES or LAES) 28b or a Pumped Hydro Storage System (PHSS) 28c.

A BESS 28a utilises electrochemical techniques and may comprise one or more of: Lithium Ion batteries, Lead acid batteries, Zinc Bromine, Sodium Sulphur or Redox Flow batteries. Electro-chemical arrangements such as batteries have advantages in terms of fast charging rates and fast (virtually instantaneous) ramp rates to supply power to cope with a sudden drop in energy supply. However, they tend to be of more limited power capacity than other systems. Therefore, they may be better suited for use in situations where, for example, a power shortfall from renewable sources is expected to be temporary or short in duration.

A CAES 28b compresses air and stores the air under a high pressure of around 70 bar. It is usually stored in an underground cavern. When power is required, the compressed air is heated and expanded in an expansion turbine in order to drive a generator.

A LAES 28b comprises an air liquefier to draw air from the environment and compress and cool the air to achieve liquefaction. The liquified air is then stored in an insulated tank until power is required. To convert the liquified air into useable energy, the liquid air is pumped to high pressure and heated through heat exchangers. The resulting high-pressure gas is used to drive a turbine to generate electricity.

CAES and LAES are capable of storing significantly more energy than most BESS 28a systems. However, CAES and LAES have slower ramp rates than electro-chemical storage devices and require longer to store larger quantities of energy. For example, it may take of the order of 5-10 minutes for a compression stage to operate under full load, and 10-20 minutes to generate full power on demand. Such storage devices are therefore more appropriate for longer-term storage and for supplying power during long periods of renewable energy shortfall.

A PHSS 28c stores energy in the form of gravitational potential energy by pumping water from a lower elevation reservoir to a higher elevation reservoir. When power is required, the water is released to drive turbines. Some PHSS arrangements utilised a reversible pump-turbine unit.

Given the large storage capacity of PHSS configurations, they are often suited to longer-term storage. In addition, particularly for reversible pump turbines, timescales of the order of 5-10 minutes from shutdown to full load generation, 5 to 30 minutes from shut down to pumping, and 10 to 40 minutes for pumping to load generation or vice vera are common. Thus, such storage would appear more appropriate for longer term power deficits.

Whilst all these elements are shown in FIG. 1, this is for illustrative purposes only. The energy storage resource 20 need not comprise each and every described element and may comprise only one or more of the described elements. In addition, the energy resource 28 may comprise additional elements.

The components of the industrial gas plant complex 10 will now be described in detail.

Hydrogen Production Plant 12

The Hydrogen production plant 12 is operable to electrolyse water to form Hydrogen and Oxygen. Any suitable source of water may be used. However, in embodiments in which sea water is used to produce the water for the electrolysis, the apparatus would further comprise at least one desalination and demineralisation plant to for processing the sea water.

The Hydrogen production plant 12 comprises a plurality of electrolysis units 12a, 12b . . . 12n or electrolysis cells. Each unit or cell may be referred to as an "electrolyser" 12a, 12b . . . 12n.

The electrolysers may enable the Hydrogen production plant 12 to have a total capacity of at least 1 GW. However, the ultimate capacity of the Hydrogen production plant 12 is limited only by practical considerations such as power supply.

Any suitable type of electrolyser may be used. In embodiments, the plurality of electrolysers usually consists of a multiplicity of individual cells combined into "modules" that also include process equipment such as pumps, coolers, and/or separators. Hundreds of cells may be used and may be grouped in separate buildings. Each module typically has a maximum capacity greater than 10 MW, although this is not intended to be limiting.

Any suitable type of electrolyser may be used with the present invention. Generally, three conventional types of electrolyser are utilized—alkaline electrolysers; PEM electrolysers; and solid oxide electrolysers. Any of these types may be used with the present invention.

Alkaline electrolysers transport hydroxide ions (OH$^-$) through the electrolyte from the cathode to the anode with hydrogen being generated on the cathode side. Commonly, a liquid alkaline solution of sodium hydroxide or potassium hydroxide is used as the electrolyte.

A PEM electrolyser utilizes a solid plastics material as an electrolyte, and water reacts at an anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit.

The electrolysers may be arranged in any suitable group. For example, they may be arranged in parallel.

Hydrogen is produced at about atmospheric pressure by the Hydrogen production plant 12. A stream of hydrogen so generated is removed from the electrolysers at a slightly elevated pressure and may be transferred via a pipe to the Ammonia synthesis plant 18.

Alternatively, any Hydrogen surplus to requirements may be stored in the Hydrogen storage unit 14. The storage unit 14 comprises of a plurality of short-term and longer-term storage options with different sizes, filling/discharge rates, and roundtrip efficiencies. Typical storage system could include pressure vessels and/or pipe segments connected to a common inlet/outlet header. The pressure vessels may be spheres, for example, to about 25 m in diameter, or "bullets" which are horizontal vessels with large L/D ratios (typically up to about 12:1) with diameters up to about 12 m. In certain geographies, underground caverns are included as storage systems to flatten out the seasonal variations associated with the renewable power.

Preferably, the Hydrogen gas is compressed by a compressor and stored in the Hydrogen storage unit 14 under pressure to reduce volume requirements. It may be used commercially at this point (e.g. sold for automotive purposes) or may be used as a reservoir for Ammonia synthesis plant 18 via pipe 30.

Optionally, a purification system may be implemented to purify or dry the Hydrogen before onward use. For example, the Hydrogen may be dried in an adsorption unit, such as a temperature swing adsorption (TSA) unit for the downstream process(es).

Air Separation Unit 16

In non-limiting embodiments, the Nitrogen gas required for Ammonia production is produced by cryogenic distillation of air in the air separation unit (ASU) 16. Typically an ASU 16 operates at a pressure of around 10 bar. The pressure is then reduced to provide a stream of Nitrogen gas in one or more pipes arranged to transport Nitrogen to the Ammonia Synthesis plant 16. However, other Nitrogen sources may be used if required, for example, Nitrogen storage 16a.

A Nitrogen gas storage unit 16a may also be provided, which can be used as a resource storage as described below. The storage unit 16a may, in common with the Hydrogen storage unit 14, comprise a plurality of short-term and longer-term storage options having different sizes, filling/discharge rates, and roundtrip efficiencies.

A typical storage system for Nitrogen may comprise a plurality of pressure vessels and/or pipe segments connected to a common inlet/outlet header. The pressure vessels may be spheres, for example, to about 25 m in diameter, or "bullets" which are horizontal vessels with large L/D ratios (typically up to about 12:1) with diameters up to about 12 m.

In certain geographies, underground caverns may be utilised to flatten out the seasonal variations associated with the renewable power.

Preferably, the Nitrogen gas is compressed by a compressor and stored in the Nitrogen storage unit 16a under pressure to reduce volume requirements. It may be used as a reservoir for Ammonia synthesis plant 18 which may be fed by a connecting pipe.

Ammonia Synthesis Plant 18

The Ammonia Synthesis plant 18 operates on the Haber-Bosch process and comprises an Ammonia Loop. An Ammonia Loop is a single unit equilibrium reactive system which processes the synthesis gas of Nitrogen and Hydrogen to produce Ammonia.

Nitrogen is provided by one or more pipes from the ASU 16 which, in embodiments, may run continuously to provide Nitrogen. Hydrogen is provided from one or more pipe from Hydrogen production plant 12 (if it is running based on the availability of the renewable power at given instance) otherwise Hydrogen is fed from the Hydrogen storage 14.

Stoichiometric composition of synthesis gas is processed by a syn-gas compressor system and the resulting Ammonia product is refrigerated by another set of compressors and sent to storage. The performance of Ammonia loop is governed by the equilibrium conversion of the exothermic reaction. The parameters for this will be discussed below.

Electricity Generation and Management System

Electricity for the plant 10 as a whole may be generated from any suitable energy source, including renewable or non-renewable energy sources. As shown in FIG. 1, the electricity is generated from at least one renewable energy source of either wind energy 24 (via a suitable wind farm comprising a plurality of wind turbines) and/or solar energy 26 (via a solar farm comprising a plurality of solar cells). In addition, other renewable energy sources may be used such as hydro-electric (not shown) and/or tidal power (not shown).

In addition, electricity or resources for the plant 10 as a whole or for sub-plants of the plant 10 may be drawn from the energy storage resource 28. As described with respect to FIG. 1, the energy storage resource 28 may comprise one or more storage resources. For example, the one or more storage resources may include the Hydrogen storage unit 14 and Nitrogen storage 16a.

Additionally or alternatively, in non-exhaustive arrangements, the energy storage devices may comprise one or more of: a Battery Energy Storage System (BESS) 28a, a Compressed/Liquid Air Energy Systems (CAES or LAES) 28b or a Pumped Hydro Storage System (PHSS) 28c.

These elements are used optimally to store additional resources and/or energy when electricity provision from renewable sources is high or predicted to be high and then utilise those resources and/or energy when renewable electricity resources are predicted to be low.

The prediction and control of these facilities will be described below. Selection of these facilities under optimal conditions is important such that the correct energy source is selected for a particular predicted power shortfall period, for example.

Control System 100

Figure 2:
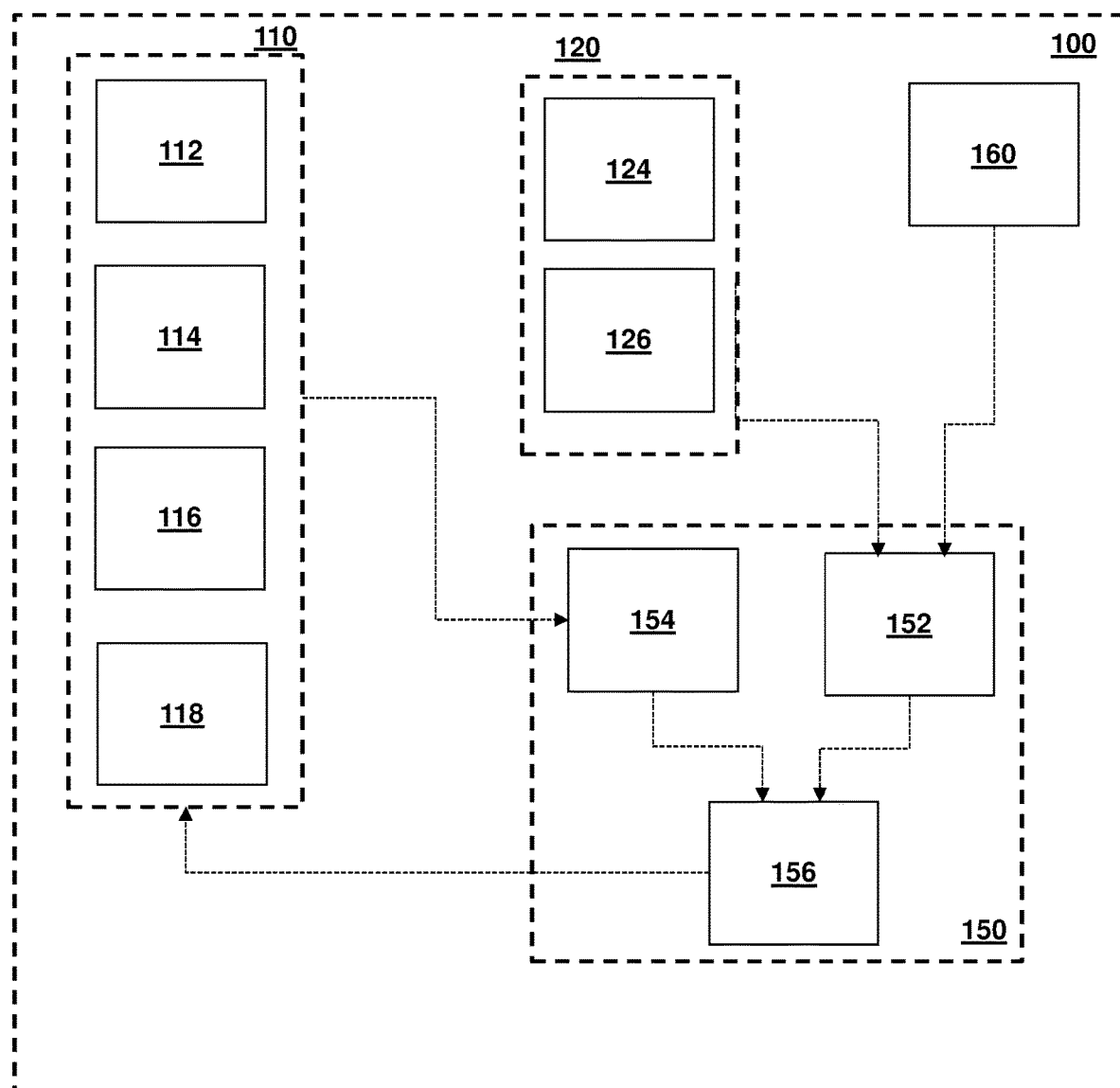
FIG. 2 is a detailed schematic diagram of the control system of FIG. 1.

The control system 100 of FIG. 1 is shown in detail in the schematic of FIG. 2.

The control system 100 comprises three main categories: plant complex control systems 110, renewable energy control systems 120 and an optimization system 150. These are non-limiting terms and do not necessarily imply any interconnection or grouping between the component parts of the systems 110, 120, 150 and are illustrated in a common grouping for clarity purposes only.

The plant complex control systems 110 comprise a Hydrogen production plant control system 112, a Hydrogen storage control system 114, an ASU control system 116 and an Ammonia synthesis plant control system 118.

By way of example, the Hydrogen production plant control system 112 may be configured to monitor the amount and rate of generation of Hydrogen gas from the electrolysis by measurement. Such a measurement may be derived from sensor measurements such as direct flow measurements, or alternatively inferred through indirect measurements such as the electrolyser current or power demand.

By way of further example, for the Hydrogen storage control system 114, the pressure and flow of compressed hydrogen from electrolyser and compression system to the storage system may be monitored, as well as the pressure and flow of compressed hydrogen gas to the Ammonia synthesis plant 18.

In each case the control systems 110 are operable to control the parameters of the respective industrial gas plant and are able to output use and process data from each industrial gas plant. This will be described in detail below.

The renewable energy control systems 120 in the described embodiments comprise the wind control system 124 and solar control system 126. These control systems control and monitor process parameters of the renewable energy source such as energy generation, storage and load. They are also configured to send usage, power and process data to external systems as required. If hydro-electric or tidal renewable power sources are used, similar control systems will apply.

The optimization system 150 comprises a computer system including three modules: a power prediction module 152, a plant operation module 154 and a real-time optimization module 156.

The power prediction module (PPM) 152 receives usage and power generation data from the renewable energy control systems 120 and also from a weather and forecast database 160 which comprises information relating to past (known and historical) environmental and weather data and future (predicted and forecast) environmental and weather data. The power prediction module 152 comprises a machine learning algorithm implemented on a computing system as will be described below and is used to generate a model relating to future power generation.

The plant operation module (POM) 154 is operable to receive plant operation data from the plant complex control systems 110 and generate a model of the plant operation. The plant operation module 152 comprises a machine learning algorithm implemented on a computing system as will be described below.

The real-time optimization module (RTOM) 156 is arranged to receive inputs from the power prediction module 152 and plant operation module 154 and derive a plant operation policy strategy including setpoint operation parameters. These are then fed to the plant complex control systems 110 to control the relevant processes controlled thereby.

The detail and operation of each component will now be described.

Power Prediction Module (PPM) 152

The power prediction module 152 comprises a machine learning algorithm implemented on a computing system and operable to generate a model to predict future power generation. In embodiments, an aspect of the power prediction module 152 is to be able to predict future power generation from a variable and/or intermittent source such as a renewable power source so that one or more industrial gas plants (which in general require a constant power load) can be controlled without risk of power starvation of the plants.

In embodiments, a further aspect of the power prediction module 152 is to use the predicted power generation data to control the plant complex 10 or aspects thereof. This will be discussed in more detail below.

The model used to predict future power is based on a machine learning framework. Any suitable machine learning algorithm may be used. For example, the model may utilise techniques such as Gradient boosting (utilising, for example, XGboost), Long short-term memory (LSTM), support vector machine (SVM) or random decision forests may be used in such a model.

Gradient boosting is a machine learning technique utilized in regression and classification problems. A strong prediction model is formed which comprises an ensemble of weak prediction models such as decision trees. A stage-wise process may be used to generate the model through steepest descent minimisation (amongst others).

LSTM is an artificial recurrent neural network architecture which has feedback connections as well as feedforward connections. A common LSTM unit is composed of a cell, an input gate, an output gate and a forget gate. The cell is operable to remember values over an arbitrary time interval the flow of information into and out of the cell is regulated by the gates.

A support vector machine utilises a set of training examples, each comprised in one of two categories, and generates a model that assigns new examples to a particular category. Thus, a SVM comprises a non-probabilistic binary linear classifier.

Random decision forests comprise ensemble machine learning methods which operate by constructing a multitude of decision trees during a training process and outputting the class that is the mode of the classes (classification) or mean/average prediction (regression) of the individual trees.

Irrespective of the machine learning algorithm used, the model utilises a two step operation process where a training stage is required prior to a predictive stage. Both stages are implemented as computer programs on one or more computer systems.

Specialist hardware may also be used. For example, the training stage may involve use of Central Processing unit (CPU) and Graphical Processing Unit (GPU) components of a computer system. In addition, other specialist hardware may be used such as Field Programmable Gate Arrays (FPGAs), Application Specific Integrated Circuits (ASICs) or other stream processor technologies.

Training Stage

The model is trained periodically (for example, on a daily basis) or on demand (if, for example, the accuracy of the model demands a training process) to create a relationship between predicted variables of the renewable energy power plant to determine predicted energy availability for a pre-determined future period.

The PPM 152 aims to determine the predicted variables of:
Wind power $WP_i$
Solar Power $SP_i$
where the index i represents time from period n to n+k in intervals of fixed duration. In non-limiting embodiments, the intervals may comprise 15 minutes or 1 hour.

The predictor variables comprise time-dependent operational characteristic data of the are:
Wind power $WP_i$
Solar Power $SP_i$
Power load $L_i$ from the period n−m to n−1.

The predictor variables also include measured environmental and meteorological signals which may comprise but are not limited to time-dependent environmental data comprising:
Air temperature $T_i$,
Atmospheric pressure $P_i$
Wind speed $WS_i$,
Cloud cover $CC_i$,
Precipitation $P_i$
Humidity $H_i$
where index i represents time from period n−m to n+k.

In the training stage, various machine learning algorithms are used to create a mathematical relationship between the predicted and predictor variables. These relationships are stored in the computer as a series of equations that can be accessed and used to make future predictions.

These models are generated during a training process which is carried out periodically at a pre-determined training time. At each training time the machine learning model is trained based on the historical time-dependent environmental data and the historical time-dependent operational characteristic data obtained within one or more pre-determined historical time windows. In other words, a moving historical window of time-dependent data (e.g. the previous 2 days, the previous 2-weeks etc.) is used to train the machine learning model.

As noted above, meteorological measurements come from the weather and forecast database 160 which may comprise a weather data service or other internet-connected resource. Load, solar power and wind power are measured by the operator or fed via the renewable energy control systems 120 as part of an automated data collection system.

Prediction Stage

In the prediction stage, the equations generated and stored in the training phase are used to enable predictions regarding future behaviour to be made.

The predicted variable comprises a forecast of wind power $WP_i$ and solar power $SP_i$ for i from c+1 to c+p, where c represents current time and p represents a prediction horizon which could be any suitable timescale; for example, non-limiting examples may be 24 hours, 48 hours or more.

The predictor variables are:
Wind power $WP_i$
Solar Power $SP_i$
Power load $L_i$
from c−r to c, measured meteorological signals (as per the training phase), and forecast meteorological signals from c+1 to c+p.

As for the training phase, environmental and meteorological measurements come from, in embodiments, the weather and forecast database 160 which may comprise a weather data service or other internet-connected resource. Load, solar power and wind power are measured by the operator or fed via the renewable energy control systems 120 automatically.

Figure 3:
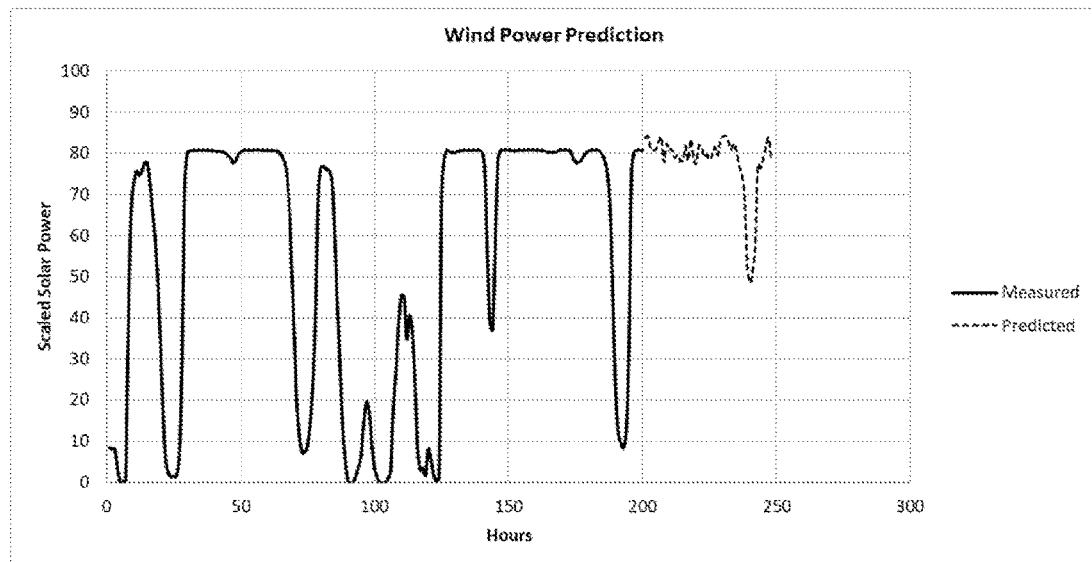
FIG. 3 is a graph showing measured and predicted wind power values using a model according to an embodiment of the present invention.
Figure 4:
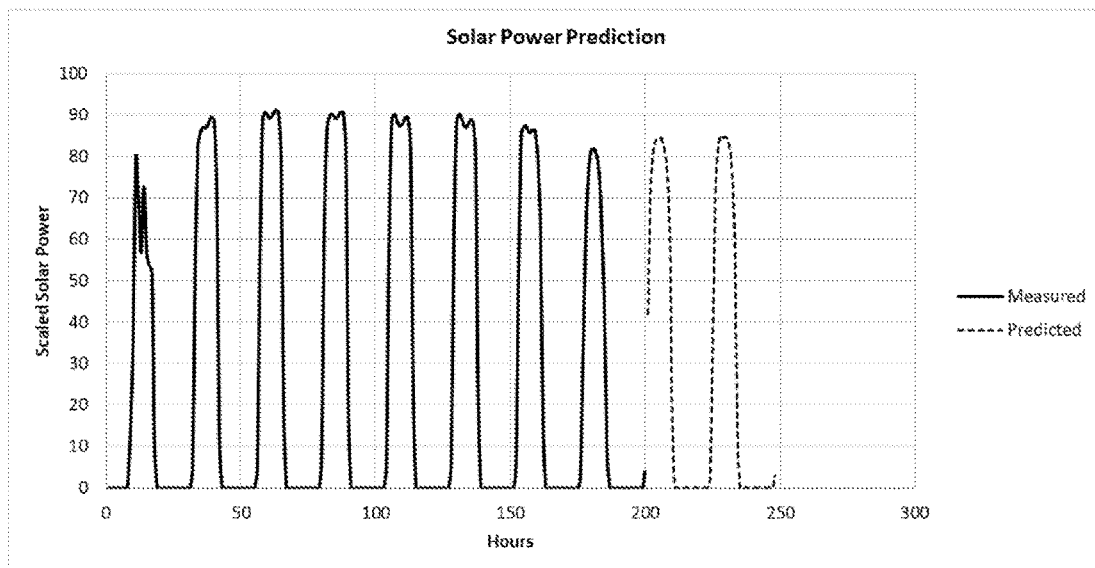
FIG. 4 is a graph showing measured and predicted solar power values using a model according to an embodiment of the present invention.

FIGS. 3 and 4 show prediction of wind power and solar power where the predicted variables are generated from the model prediction stage above.

In embodiments, an assessment of the accuracy of the machine learning model is made by comparing a value of the predicted power resources for a pre-determined future time period with the actual power resources which were available to the industrial gas plant at the end of the predicted future time period. This enables determination of a prediction error value which provides a metric for the accuracy of the model.

If the model is insufficiently accurate, it may need to be trained at a further training time. The pre-determined training time may be selected based on the prediction error value which may, in embodiments, be when the prediction error value exceeds a pre-determined threshold.

In embodiments, the training time may be selected empirically on a periodic basis; for example, every 24 hours or every 48 hours as appropriate. In embodiments, this periodic basis may be the default training time strategy.

However, in embodiments, this may be interrupted when the prediction error value exceeds the pre-determined threshold within the pre-determined empirical interval, in which case the training time is scheduled based on the prediction error value.

Control Based on Predicted Data

The PPM 152 may utilise the predicted data to control the one or more industrial gas plants in response to the predicted available power resources for the pre-determined future time period. For example, in addition to the RTM 156, the PPM 152 may control operational aspects of the of the one or more industrial gas plants.

In embodiments, the forecast power data may additionally or alternatively control the use of the storage resource 28. As described above, the storage resource 28 may comprise resource storage such as stored Hydrogen and/or Nitrogen, and energy storage through BESS 28a, CAES/LAES 28b and PHSS 28c amongst others.

The PPM 152 may therefore comprise a control and optimization algorithm which utilizes the predicted power resources to optimize usage of the available storage resources 28 to run the plant complex 10 optimally and to plan for future power availability and power usages.

The PPM 152 system uses the predicted powers WPi and SPi as inputs in a real-time optimization problem and applies an optimization algorithm to propose optimal rates at which to run the industrial gas complex 10 to maximize the utilisation of the available power and the stored resources in the resource storage 28.

For example, expected daily and seasonal variability in predicted power generation may be addressed by the PPM 152 by determining an optimal use of short-term (e.g. BESS 28a) and longer-term (e.g. CAES/LAES 28b and PHSS 28c) storage systems in the storage resource 28.

In embodiments, the PPM 152 may determine optimal power up and shut down times for storage resources 28 to maximize available power utilization. Examples of this will be described below.

In a non-limiting example, the PPM 152 may determine that sufficient power is available over the next 24 hours to run the electrolyzers 12a . . . n of the Hydrogen production plant 12 under greater load to generate more Hydrogen than required to produce an optimal Ammonia production rate over the predetermined time period. The additional Hydrogen may then be stored in the Hydrogen storage 14 for use during lower power availability periods. The same may apply to the ASU 16 and Nitrogen storage 16a.

The PPM 152 may receive operational characteristic data for the Hydrogen storage 14 and Nitrogen storage 16a. This may include fill levels and other operational data (e.g. fill pressures, fill volume, density etc.) This operational data may be used by an algorithm forming part of the PPM 152 to determine optimal storage requirements to address predicted future power availability distribution as a function of time.

In embodiments, the PPM 152 may also determine that sufficient power is available over a predicted time window to store additional power in the energy storage 28a, 28b, 28c. The PPM 152 may utilize an optimization algorithm to select the appropriate energy storage 28a, 28b, 28c depending upon the power availability vs time predictions.

In a non-limiting example, the PPM 152 may determine that power availability in excess of plant complex 10 demand is available for a relatively short period (e.g. 1-2 hours). It may then be determined that BESS 28a represents the most appropriate energy storage solution for that time period given the short ramp rate, fast charging time and lower capacity of BESS 28a solutions.

In an alternative non-limiting example, the PPM 152 may determine that significant power availability in excess of plant complex 10 demand is available for a longer period (e.g. 5-10 hours). In this situation, it may then be determined that CAES/LAES 28b and PHSS 28c may be better suited to storage of the available power given the slower ramp rates and higher storage capacity of such energy storage solutions.

The PPM 152 system solves the optimization problem for the next p time periods applies the available power predictions in a real time optimization model to maximize the utilization of power. The model may involve the generation of a power utilization metric and the optimization seeks to optimize the value of the power generation metric.

The PPM 152 may also comprise a tracking system to calculate the predicted power utilization metric as a function of complementarity of renewable power resources and adjust the generations levels/utilization to maximize long term utilization of renewable resources.

Figure 5:
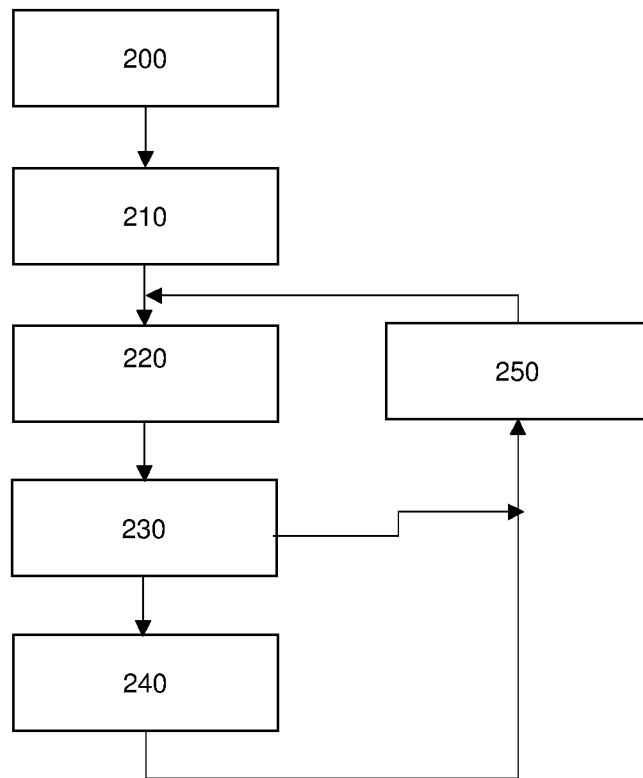
FIG. 5 is a flow chart of a method according to an embodiment.

The PPM 152 system is implemented on a computer and receives various inputs from other computer systems. An example of the PPM 152 system may utilise Mixed Integer Non Linear Programs (MINLP) because some of the decisions require some equipment to be run in one of multiple possible modes leading to integer variables. FIG. 5 shows a method according to an embodiment. Note the following steps need not be carried out in the order described below and some steps may be carried out concurrently with other steps.

In embodiments, a method of predicting available power resources from one or more renewable power sources for one or more industrial gas plants is provided. The method executed by at least one hardware processor.

At step 200, historical time-dependent environmental data associated with the one or more renewable power sources 24, 26 is obtained. By historical is meant past environmental data. This may be gathered in any suitable time window, and may include data within a window which extends up to but not including the present time.

At step 210, historical time-dependent operational characteristic data associated with the one or more renewable power sources. By historical is meant past operational characteristic data such as power output. This may be gathered in any suitable time window, and may include data within a window which extends up to but not including the present time.

At step 220, a machine learning model is trained based on the historical time-dependent environmental data and the historical time-dependent operational characteristic data captured in steps 200 and 210. The model may be trained any suitable number of times and at pre-determined intervals or on demand.

At step 230, the trained machine learning model is executed to predict available power resources for the one or more industrial gas plants for a pre-determined future time period.

At step 240, the predicted data may optionally be used to control the one or more industrial gas plants in response to the predicted available power resources for the pre-determined future time period. For example, one or more operational setpoints of the one or more industrial gas plants may be set in dependence upon the predicted available power resources.

In addition, as described above, an optimization algorithm may be utilized based on the predicted available power resources for a pre-determined future period to determine how best to manage storage resource 28 which includes resource storage such as Hydrogen storage 14 and Nitrogen storage 16 and energy storage resources 28a, 28b, 28c. The optimization algorithm may select the optimal scheduling and/or select the optimal resources for a given pattern of predicted power availability as a function of time.

The selection and scheduling may be based on operational characteristics of the storage resources; for example, the fill levels, pressures and other characteristics of the Hydrogen and Nitrogen storage 14, 16a, or the ramp up/ramp down, time dependency, maximum generated power/maximum stored energy operational profiles of the energy storage resources 28a, 28b, 28c.

At step 250, a determination is made as to whether a further training process is required. This may be based on an empirical metric such as a pre-determined time period. Alternatively, it may be based on an assessment of the accuracy of the machine learning model by comparing a value of the predicted power resources for a pre-determined future time period with the actual power resources which were available to the industrial gas plant at the end of the predicted future time period. This enables determination of a prediction error value which provides a metric for the accuracy of the model.

If it is determined that the model needs retraining, a training time may be scheduled and the method may move back to training in step 220. Note that this may occur following or during either of steps 230 or 240.

Plant Operation Module (POM) 154

Optimization of the plant process control is critical to achieving efficiency. Given that renewable power sources will nearly always result in variations in the available power, the industrial gasplant complex 10 may frequently be operating in a dynamic mode. This requires real-time performance models to devise a robust operational strategy. The POM 154 comprises a machine learning and physics-based model to model plant operation. The physics-based models may be utilised to generate predictor variables indicative of operational characteristics of the respective industrial gas plant. These may be used, in embodiments, together with other operational plant data (e.g. power input, power output, gas output) as time-dependent data inputs to a respective machine learning model.

As noted above, the industrial gasplant complex 10 comprises the Hydrogen production plant 12, the Hydrogen storage unit 14, the Air Separation Unit (ASU) 16, the Ammonia synthesis plant 18 and the ammonia storage unit 20, some of which are controlled by respective control systems: Hydrogen production plant control system 112, Hydrogen storage control system 114, ASU control system 116 and Ammonia synthesis plant control system 118.

At every time step, in embodiments, the power availability forecast from PPM 152 is used to define the operational setpoints of the different industrial gas plants 112, 114, 116, 118.

These decisions are operable in embodiments to achieve a high process efficiency. This requires accurate quantitative understanding of the different process units in terms of their real-time performance, system availability information together with resource availability and impending maintenance issues.

The POM 154 is configured to capture the time-varying attributes for each of the subsystems (i.e. the respective industrial gas plants) and predict the production efficiency of the overall process in terms of Ammonia produced for a given level of energy consumed.

A high-fidelity model for such a prediction is based on real-time machine learning framework, which uses time-dependent historical data provided by aa Distributed Control System (DCS) in the form of time series for various process tags. Any suitable machine learning algorithm may be used to build ensemble models for individual subsystems. For example, the model may utilise techniques such as Gradient boosting (utilising, for example, XGboost), Long short-term memory (LSTM), support vector machine (SVM) or random decision forests.

POM 154—Hydrogen Production Plant 12 Modelling

Water electrolysis is an energy intensive process and a key process step in the production of Green Hydrogen. Each of the electrolyser modules 12a, 12b . . . 12n of the Hydrogen production plant 12 is made up of hundreds of electrolytic cells working together to covert the renewable power into molecules of hydrogen governed by the time-dependent module efficiency η.

Each of the electrolyser modules 12[k] in the Hydrogen production plant 12 is modelled independently based on its historical performance data. The predicted operational characteristic variables utilized are:

Electrolyzer Power Consumed [EP(i,k)]
Electrolyzer Hydrogen Produced [EH(i,k)]
Which are based on number of predictor variables such as:
Demin Water Flow [ED(i,k)]
Average cell temperature [ECT(i,k)],
Average cell pressure [ECP(i,k)],
Current flowing through the electrodes [I(i,k)]
Amongst other key process indicators.

Historical time series data for predictor and response variables are sampled over several months sampled at appropriate frequency [s] and are used to develop a model for the actual module efficiency. The model is built using equations derived from the predictor variables.

In addition, the totalizer variable is used to track the functioning age of the module, which is one of the predictor variables in the model. Reliability and maintenance event information from asset management system.

The model will be trained periodically or on demand (to create a relationship between response variables at time n with respect to predictor variables at each of the time instances starting from n−1 to n−k in intervals of fixed duration such as 15 minutes, or 1 hour.

In the training system various machine learning algorithms are used to create a mathematical relationship between the predicted and predictor variables.

POM 154—Ammonia Loop Modelling

The Ammonia Loop is a single unit equilibrium reactive system which processes the synthesis gas of nitrogen and hydrogen to produce ammonia. Nitrogen is provided by the ASU 16 which, in embodiments, is running continuously to provide Nitrogen.

Hydrogen is provided from the Hydrogen production plant 12 if it is running based on the availability of the renewable power at given instance or else hydrogen is fed from the Hydrogen storage 14.

Stoichiometric composition of synthesis gas is processed by the syn-gas compressor system and the product is refrigerated by another set of compressors and sent to storage.

The performance of the Ammonia loop is governed by the equilibrium conversion of the exothermic reaction and is monitored in real-time based on the predictive model for Ammonia flow to storage, AFi as a function various predictor variables, including:

Power consumed by Ammonia loop, APi,

Ammonia loop pressure and Temperature, ALPi, ALTi

Feed flow rates of nitrogen and hydrogen streams, ANFi, AHFi

Ammonia plant syngas compressor pressure, ACPi.

Additional information on the health of the catalyst bed and timing of maintenance events may be used in the model to get the most realistic picture of the conversion loop efficiency.

A further aspect of the Ammonia loop is the different modes of operation. In embodiments, two main modes are present: Normal and Stand-by. The Normal model involves ramping up and down in response to the amount of Hydrogen available. This data is tracked in the DCS and is utilized to see any performance differences or to diagnose any process deviations from production planning. This time-dependent operational characteristic data may be utilized as inputs to the trained machine learning model to predict future operational behaviour.

As set out below, the model is trained periodically over a longer-range historical data set (which may be, for example, 6 months to a year) to capture all modes and different levels of ramp rates.

POM 154—Hydrogen Storage 14 Modelling

The Hydrogen storage unit 14 comprises, in embodiments, Hydrogen purification trains, storage and a set of compressors which are operable in a dynamic fashion to direct the Hydrogen delivery to the Ammonia process plant and manage the Hydrogen inventory to avoid shutdowns due to lack of available gas resources.

The overall performance of the system is measured by achieving the specified set points on header pressure in a reliable and energy efficient manner. The compressors are modelled in terms of iso-entropic efficiencies based on operating temperatures and ambient conditions. Real-time condition monitoring of all the compressors is based on adaptive multi-variate (Principal Component Analysis (PCA) and Partial Least Squares (PLS) models are built on moving 3-month window of historical data of key process tags.

Real-time tracking of Hydrogen storage may be based on first principal thermodynamic models based on using:

Storage system pressure and temperature, SPi, STi

Hydrogen compressor pressure and flow, HCPi, HCFi.

The efficiency of the compressor system is tracked using the compressor power consumed, CPi. In addition this system may perform the real-time monitoring of the Hydrogen purification system in terms of both efficiency and reliability.

POM 154—ASU 16 Modelling

In order to model the Air Separation Unit 16, in embodiments, multi-variate partial least squares (PLS) and principle component analysis (PCA) models along with engineering models are utilized. These models are operable to diagnose performance impacts and and identify preferred operating modes. Data from these models may be utilized as operational characteristic data input into a trained machine learning model.

Several key performance indicators (KPIs) may be selected. In non-limiting examples they may comprise specific power, $N_2$ recovery, and temperature differences in a heat exchanger forming part of the ASU.) The KPIs are tracked in real-time for early detection and diagnosis of inefficient operations as well as emerging degradation of equipment health. The generation of the KPIs are not material to the present invention however these values may be utilised by the predictive machine learning model to build a predictive model of the performance of the ASU 16.

Industrial Gas Plant Model Component Training and Prediction

For each industrial gas plant, a machine learning model is assigned and implemented as set out above. For each plant, the machine learning model is operable to utilise a training process to generate equations which model the behaviour of the respective industrial gas plant. This is done using the predictor variables set out above for each industrial gas plant.

The training process may take historical time-dependent operational characteristic data as an input to train the machine learning model. The operational characteristic data may comprise physical measured data relating to the respective industrial gas plant such as, in non-limiting embodiments, input power, power usage, gas output, measured efficiency etc.

In addition, the operational characteristic data may comprise data generated by one or more physics-based models as discussed above. The physics-based models may take measured specific industrial gas plant characteristics (specific to each industrial gas plant) and may generate one or more metrics indicative of the performance of the industrial gas plant. These time-dependent metrics may then be used as inputted operational characteristic data to train the machine learning model assigned to the respective industrial gas plant.

Once a training process at a training time is complete, the model can be used to predict the behaviour of the respective industrial gas plant. In the prediction stage, the equations generated and stored in the training phase are used to enable predictions regarding future behaviour to be made.

In embodiments, an assessment of the accuracy of the machine learning model is made by comparing a value of the predicted future behaviour of each industrial gas plant for a pre-determined future time period with the actual behaviour of the industrial gas plant at the end of the predicted future time period. This enables determination of a prediction error value which provides a metric for the accuracy of the model.

If the model is insufficiently accurate, it may need to be trained at a further training time. The pre-determined training time may be selected based on the prediction error value which may, in embodiments, be when the prediction error value exceeds a pre-determined threshold.

In embodiments, the training time may be selected empirically on a periodic basis; for example, every 24 hours or every 48 hours as appropriate. Given, in embodiments, that historical data may extend over a number of months, training may not need to be so frequent. In embodiments, this periodic basis may be the default training time strategy.

However, in embodiments, this may be interrupted when the prediction error value exceeds the pre-determined threshold within the pre-determined empirical interval, in which case the training time is scheduled based on the prediction error value.

POM 154 Summary

As discussed above, machine learning models are provided for each of the industrial gas plants forming the industrial gas complex. These machine learning models are trained on operational characteristic data generated, as described above, from measured historical time-dependent data relating to the relevant plant and/or from time-dependent data generated from one or more physics-based models of the respective plant.

These models each generate predicted data relating to one or more of: the performance; the capability; the efficiency; the maintenance status; and/or the utilization of the relevant plant.

Figure 7:
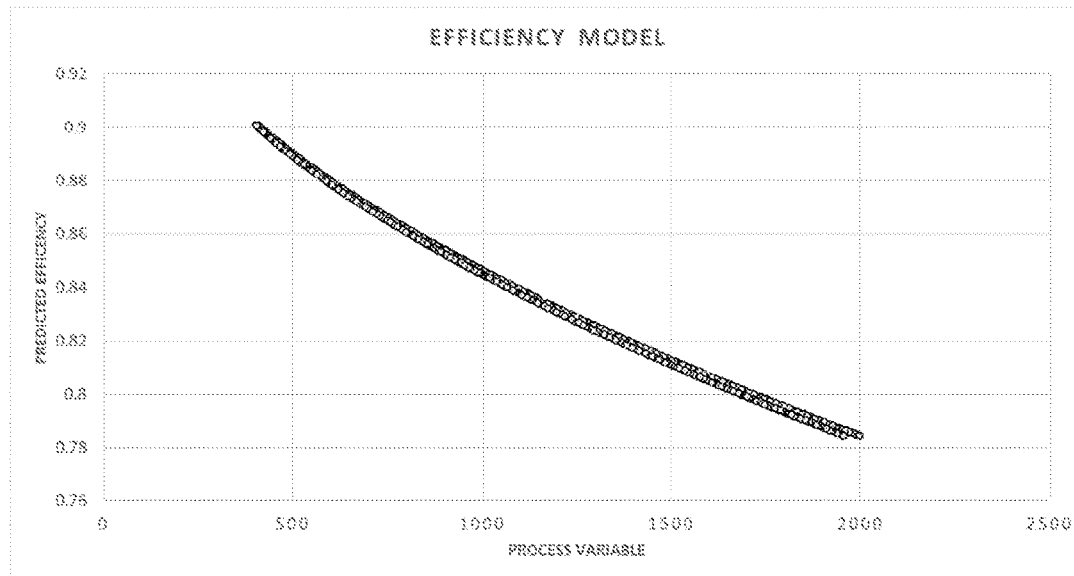
FIG. 7 is a graph showing the efficiency model for a process variable.

An example of a generated efficiency curve for a process variable is shown in FIG. 7. FIG. 7 shows a curve of efficiency of electrolyser vs load on an electrolyser. This curve is generated from time-dependent operational characteristic data from an electrolyser forming part of the Hydrogen plant 12 which is input into the respective machine learning model to generate operational characteristic data.

In addition to the predictions of the individual machine learning models assigned to each industrial gas plant, a further model may be utilized which determines the overall performance of the plant complex at a given instance is based on combining the efficiency of individual modules coming from each of the models above. Ensemble machine learning algorithms are employed to improve the quality of predictions and best models are selected to be used in the prediction system.

In other words, the time-varying operational characteristics for each of the industrial gas plants forming part of the plant complex for a pre-determined future period are predicted by each of the trained machine learning models and input into a further model to predict the production efficiency of the overall process plant complex. Data from each of the models may be input into the collective model on a periodic basis; for example, in non-limiting embodiments this may be every 15 minutes.

In terms of the Ammonia production plant in the exemplary embodiment, the efficiency determination enables a predicted determination of the Ammonia produced for a given level of energy input.

All the modelling carried out in the POM 154 is implemented as computer programs on one or more computers in the plant. Irrespective of the machine learning algorithm used, the model utilises a two step operation process where a training stage is required prior to a predictive stage. Both stages are implemented as computer programs on one or more computer systems.

Specialist and non-specialist hardware may also be used. For example, the training stage may involve use of Central Processing unit (CPU) and Graphical Processing Unit (GPU) components of a computer system. In addition, other specialist hardware may be used such as Field Programmable Gate Arrays (FPGAs), Application Specific Integrated Circuits (ASICs) or other stream processor technologies.

The model execution computer(s) will be connected to other computer database systems where the data from the plant and weather data service will be stored. As the plant is operating, performance models are used to make predictions every 15 minutes to get the production profiles.

All the performance models along with some of the unit-operation level data is used in the RTOM 156 at a pre-defined frequency to optimize the operational efficiency and define the setpoints for different models.

Method of Operation

Figure 6:
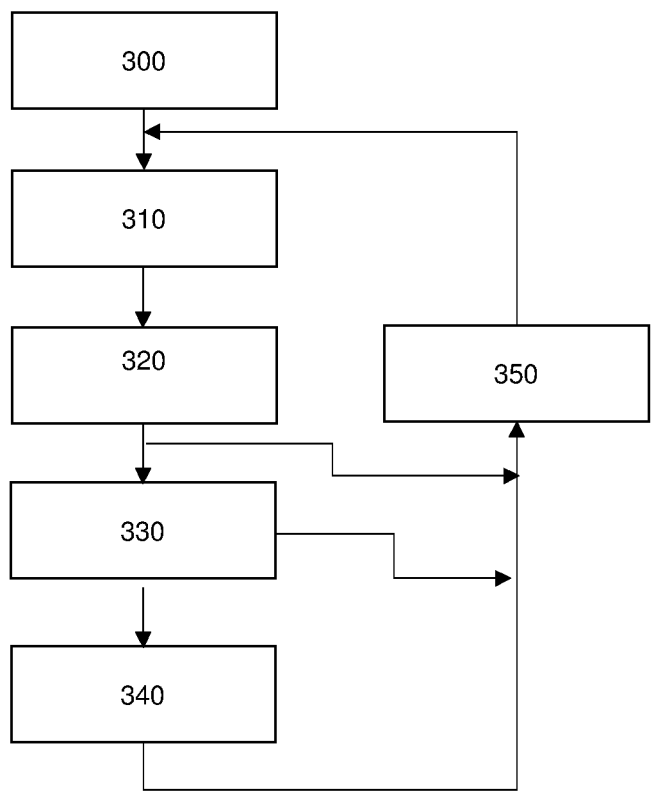
FIG. 6 is a flow chart of a method according to an embodiment.

FIG. 6 shows a method according to an embodiment. Note the following steps need not be carried out in the order described below and some steps may be carried out concurrently with other steps.

In embodiments, a method of predicting operational characteristics of an industrial gas plant complex comprising a plurality of industrial gas plants is provided. The method is executed by at least one hardware processor.

At step 300, a machine learning model is assigned to each of the industrial gas plants forming the industrial gas plant complex. This model may take any suitable form as described above. It may utilize historical time-dependent operational characteristics of the industrial gas plant to generate equations to make future predictions.

At step 310, the respective machine learning model for each industrial gas plant is trained based on received historical time-dependent operational characteristic data for the respective industrial gas plant. This data may take any suitable form and may be specific to a particular type of industrial gas plant as described above. By historical is meant past operational characteristic data. This may be gathered in any suitable time window, and may include data within a moving window which extends up to but not including the present time. The window may in embodiments be six months to a year long.

The historical time-dependent operational characteristic data may comprise physical measured data relating to the respective industrial gas plant such as, in non-limiting embodiments, input power, power usage, gas output, measured efficiency etc.

In addition, the operational characteristic data may comprise data generated by one or more physics-based models as discussed above. The physics-based models may take measured specific industrial gas plant characteristics (specific to each industrial gas plant) and may generate one or more metrics indicative of the performance of the industrial gas plant. These time-dependent metrics may then be used as inputted operational characteristic data to train the machine learning model assigned to the respective industrial gas plant.

At step 320, the trained machine learning model for each industrial gas plant is executed to predict operational characteristics for each respective industrial gas plant for a pre-determined future time period. This prediction may optionally be used to control the behavior of the respective industrial gas plant, to predict likely usage, maintenance schedules, resource allocation or to identify process issues and potential problems.

For example, the predicted data may be used to infer other technical properties of the industrial gas plant(s). The predictions may be used to determine resource planning, maintenance schedules or servicing requirements. This scheduling of maintenance may be done in conjunction with determination of power resources and capacity of storage units. For example, the maintenance of a gas-generating component (e.g. electrolyzers, ASUs, Ammonia production plant) may be scheduled to occur during a period when gas stores are high and predicted available renewable power is low so as to minimize disruption and maintain continuity of service provision.

In addition, the data may also be utilized to determine setpoint characteristics in step 330 below.

At step 330, the predicted operational characteristics determined by the models in step 320 for each respective industrial gas plant are utilized in a further collective model to generate an operational performance metric of the industrial gas plant complex. In the Ammonia production plant in the exemplary embodiment, the efficiency determination enables a predicted determination of the Ammonia produced for a given level of energy input.

At step 340, the predicted data for a pre-determined future time period is compared to actual measured data at the end of the time period. This comparison is used to infer other technical properties of the industrial gas plant(s). The predictions may be used to determine resource planning, maintenance schedules or servicing requirements.

In embodiments, a prediction for a pre-determined time period (e.g. a time window of, for example, 2 weeks, one month, six months from generation of the predicted data or from a time stamp in the predicted data) is then compared to actual data for the time window or time period at the end of the time period covered by the predicted data (e.g. after 2 weeks/one month/six months from the predicted data generation or from the time stamp in the predicted data). This enables potential problems in the plant complex 10 to be identified early since deviation of any industrial gas plant or storage system from a predicted model based on past actual behaviour may indicate development of a production or maintenance problem.

By using such a method, potential future problems can be identified early, enabling remedial action to be taken before any critical failures or unplanned shut-downs of the plant services are required for urgent maintenance or repair.

In addition, in embodiments, the scheduling of maintenance may be done in conjunction with determination of power resources and capacity of storage units. For example, the maintenance of a gas-generating component (e.g. electrolyzers, ASUs, Ammonia production plant) may be scheduled to occur during a period when gas stores are high and predicted available renewable power is low so as to minimize disruption and maintain continuity of service provision.

In embodiments, the predicted data may optionally be used to control the one or more industrial gas plants in response to the predicted operational characteristics of the industrial gas plants for the pre-determined future time period. For example, one or more operational setpoints of the one or more industrial gas plants may be set in dependence upon the predicted behavior.

The control in step 340 may be done in conjunction with the method described in steps 200 to 250 where predicted power availability is utilized in combination with the predicted efficiency determination in step 330 to enable set points to be determined based on both predicted power availability and also plant efficiency.

At step 350, a determination is made as to whether a further training process is required. This may be based on an empirical metric such as a pre-determined time period. Alternatively, it may be based on an assessment of the accuracy of the machine learning model by comparing a value of the predicted operational characteristics for a pre-determined future time period with the actual operational characteristics of the industrial gas plant at the end of the predicted future time period. This enables determination of a prediction error value which provides a metric for the accuracy of the model.

If it is determined that the model needs retraining, a training time may be scheduled and the method may move back to training in step 310. Note that this may occur following any of steps 320, 330 or 340.

Real-Time Optimization Module (RTOM) 156

The RTOM 156 comprises a system to determine the rate at which various industrial gas plants should run to manage the renewable hydrogen production and storage optimally while maximizing ammonia production. In other words, the RTOM 156 enables real-time optimization of an industrial gas plant complex using renewable power. More particularly, in embodiments, In embodiments, the system solves an optimization algorithm applied to a dynamic mathematical model of an industrial gas plant complex. The RTOM 156 system uses the predicted powers WPi and SPi and state of the industrial gas plants such as efficiencies inferred from plant-specific factors discussed above in relation to the POM 154 such as current, pressure, temperature and flowrate measurements. These values are taken as the inputs and applies an optimization algorithm to propose optimal rates at which to run the ammonia plant for time periods from c+1 to c+p.

The rates of the other industrial gas plants such as Hydrogen production plant 12, hydrogen compression and storage system 14, the air separation unit 16, Nitrogen storage 16a and the water plant are linked to ammonia rate and are controlled by lower-level controllers as described above. Only the first value from the list of optimal value for time c+1 is implemented, and the calculation is repeated at time c+1 with new data as it becomes available.

The RTOM 156 may also utilise data relating to the resource storage devices or energy storage devices of the storage resource 28. As noted above, the energy storage devices may comprise one or more of: a Battery Energy Storage System (BESS) 28a, a Compressed/Liquid Air Energy Systems (CAES or LAES) 28b or a Pumped Hydro Storage System (PHSS) 28c. The status, operational characteristics, availability, resource storage level and ease of power availability of each of the units of the storage resource 28 may be factored in to the optimization problem.

The RTOM 156 system is implemented on a computer and receives various inputs from other computer systems. The predicted power comes from PPM 152. The state of the industrial gas plants are represented by equations relating power consumptions of various units such as electrolyzer (ECi), hydrogen compressor (CPi), ammonia plant (APi), and ASU (NPi) to process variables related to these units.

The RTOM 156 system solves an optimization problem which seeks to maximize ammonia production given constraints on total amount of predicted power available over the next p time periods, amount of hydrogen available in storage, physics or data-based equations describing process plant operation.

Typically such problems are Mixed Integer Non Linear Programs (MINLP) because the process plant equations are non-linear and some of the decisions require some equipment to be run in one of a few possible modes leading to integer variables. The optimization generates set points from time c+1 to c+p to balance the predicted generated power and consumed power so that right amount of hydrogen is produced and ammonia plant runs at the correct rate to maximize ammonia production. The RTOM 156 system also accounts for hydrogen storage and hydrogen may either be stored or consumed from storage based on future power prediction.

In addition, the RTOM 156 system can choose to recommend that the plant may go into standby or shutdown modes based on power availability and equipment availability information. The output of the RTOM 156 system is a recommend ammonia production rate that is transferred automatically to advanced control systems controlling the ammonia plant, ASU, electrolyzer, water plant and hydrogen compression and storage.

Figure 8:
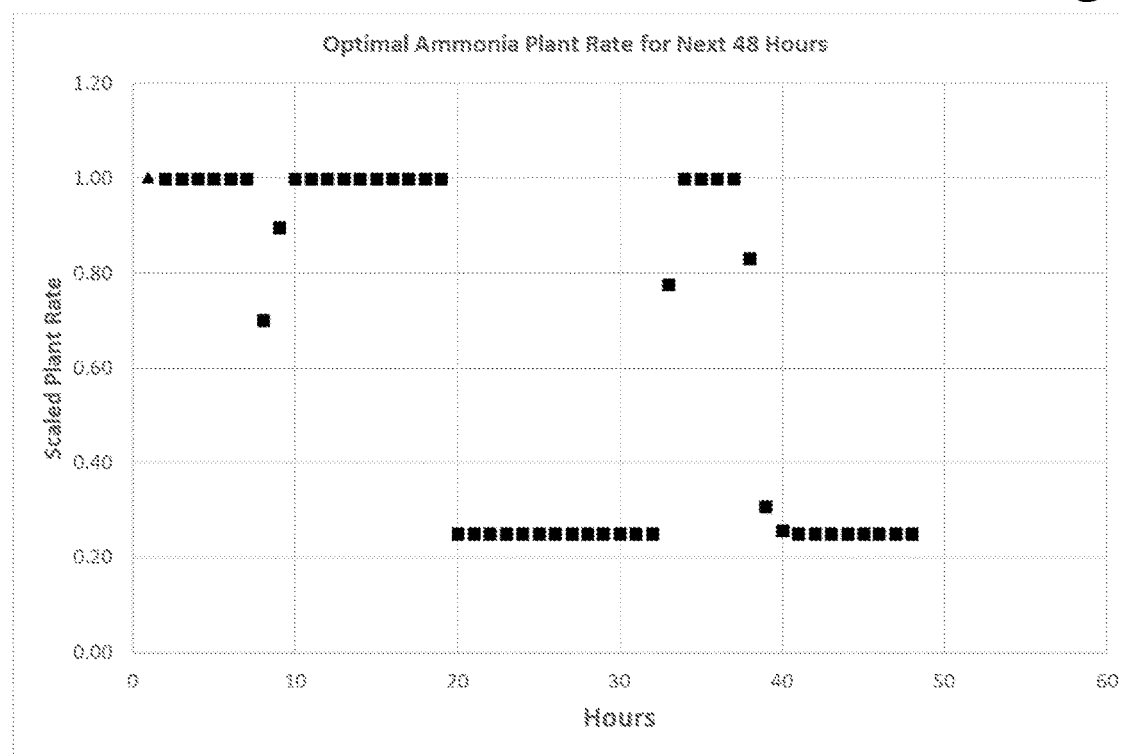
FIG. 8 is a graph of optimal Ammonia plant rate as a function of time for a 48 hour predicted period.
Figure 9:
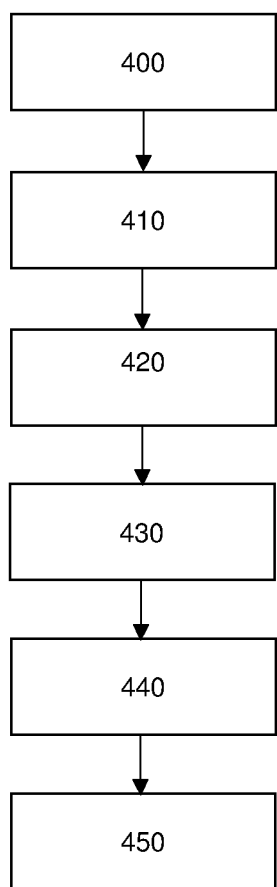
FIG. 9 is a flow chart of a method according to an embodiment.

An example of this is shown in FIG. 8 which shows the optimal Ammonia plant rate as a function of time for a 48 hour predicted period.

Method of Operation

In embodiments, there is provided a method of controlling an industrial gas plant complex comprising a plurality of industrial gas plants powered by one or more renewable power sources. The method is executed by at least one hardware processor.

At step 410, time-dependent predicted power data for a pre-determined future time period from the one or more renewable power sources is received. In non-limiting embodiments, this may be determined by the PPM 152 in accordance with the process and method discussed at steps 200 to 250. Alternatively, the predicted power data may be obtained in accordance with any other suitable process.

At step 420, time-dependent predicted operational characteristic data for each industrial gas plant is received. In this context "industrial gas plant" may also include industrial gas storage, for example, Hydrogen, Nitrogen and/or Ammonia storage as described above in the present embodiments.

The operational characteristic data may, in embodiments, be generated in accordance with the protocols described in relation to the POM 156 and method steps 300 to 350 of FIG. 6. However, said data may also be determined in accordance with any other suitable process.

At step 430, the predicted power data and predicted characteristic data is utilized in an optimization model to generate a set of state variables (which may be optimized state variables) for the plurality of industrial gas plants. In embodiments, this may be done by solving an optimization problem. For example, in non-limiting embodiments the optimization model may define the predicted power data and predicted characteristic data as a set of non-linear equations. Storage resource data may optionally be included in the power data. The state variables are then generated by solving the set of non-linear equations.

At step 440, the generated state variables (which may be optimized state variables) are utilized to generate a set of control set points for the plurality of industrial gas plants. The set points may be defined to achieve any specified goal. For example, the set points may be defined at a particular time to ensure that the industrial gas plant(s) are operated efficiently and effectively given the power and storage resources available. The set points may alternatively or additionally be utilized to maximize the production of industrial gas given the predicted power availability.

As a further example, the predicted power availability and predicted efficiency and operational characteristics of the individual industrial gas plants and/or the industrial gas plant complex as a whole may be utilized to prevent power starvation of the individual plants and/or plant complex or to increase production in situations where power availability is plentiful at the present time but a future shortfall is predicted.

At step 450, the control set points are sent to a control system to control the industrial gas plant complex by adjusting one or more control set points of the industrial gas plants.

In summary, in exemplary embodiments a control and optimization system for a industrial gas plant complex is provided. The industrial gas plant complex comprises a plurality of industrial gas plants, including a Hydrogen production plant utilizing electrolysis of water, an air separation plant for production of nitrogen, an ammonia synthesis plant to produce ammonia, a hydrogen storage system and an ammonia storage and shipment system.

In exemplary embodiments, the system seeks to maximize ammonia production given an uncertain future power input for the system. The system also includes a machine learning based program to predict future power input based on weather forecast. This program continuously learns from environmental and weather patterns and power generated to make future power generation predictions. The system also includes another machine learning program to learn from industrial gas plants operating data and modify the mathematical model used for optimization.

While the invention has been described with reference to the preferred embodiments depicted in the figures, it will be appreciated that various modifications are possible within the spirit or scope of the invention as defined in the following claims.

In the specification and claims, the term "industrial gas plant" is intended to refer to process plants which produce, or are involved in the production of industrial gases, commercial gases, medical gases, inorganic gases, organic gases, fuel gases and green fuel gases either in gaseous, liquified or compressed form.

For example, the term "industrial gas plant" may include process plants for the manufacture of gases such as those described in NACE class 20.11 and which includes, non-exhaustively: elemental gases; liquid or compressed air; refrigerant gases; mixed industrial gases; inert gases such as carbon dioxide; and isolating gases. Further, the term "industrial gas plant" may also include process plants for the manufacture of industrial gases in NACE class 20.15 such as Ammonia, process plants for the extraction and/or manufacture of methane, ethane, butane or propane (NACE classes 06.20 and 19.20), and manufacture of gaseous fuels as defined by NACE class 35.21. The above has been described with respect to the European NACE system but is intended to cover equivalent classes under the North American classifications SIC and NAICS. In addition, the above list is non-limiting and non-exhaustive.

In some of the examples a hydrogen storage system and in some cases a purification unit are shown. However, it will be appreciated that the present invention can be implemented without the use of a hydrogen storage system or purification unit, which are only shown here for completeness.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

In the discussion of embodiments of the present invention, the pressures given are absolute pressures unless otherwise stated.

All prior teachings above are hereby incorporated herein by reference. No acknowledgement of any prior published document herein should be taken to be an admission or representation that the teaching thereof was common general knowledge in Australia or elsewhere at the date thereof.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules", "units" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method of controlling an industrial gas plant complex comprising one or more industrial gas plants powered by one or more renewable power sources, the method being executed by at least one hardware processor, the method comprising:
receiving time-dependent predicted power data for a pre-determined future time period from the one or more renewable power sources;
receiving time-dependent predicted operational characteristic data for each industrial gas plant, the time-dependent predicted operational characteristic data including data for:
hydrogen storage for hydrogen storage of hydrogen output from a hydrogen production plant;
electrolyzer hydrogen produced for the hydrogen production plant;
nitrogen storage for nitrogen storage of an air separation unit (ASU); and/or
ammonia flow to storage for an ammonia loop of the ammonia production plant;
utilizing the predicted power data and predicted characteristic data in an optimization model to generate a set of state variables for the one or more industrial gas plants such that the optimization model defines the predicted power data and predicted characteristic data as a set of non-linear equations and the state variables are generated by solving the set of non-linear equations, the one or more industrial gas plants comprising the hydrogen production plant and the ammonia production plant;
utilizing the generated state variables to generate a set of control set points for the one or more industrial gas plants for maximizing ammonia production of an ammonia production plant of the one or more industrial gas plants; and
sending the control set points to a control system to control the industrial gas plant complex by adjusting one or more control set points of the one or more industrial gas plants.

2. The method of claim 1, wherein the time-dependent predicted power data is generated from a trained machine learning model.

3. The method of claim 2, wherein the time-dependent predicted power data is obtained by:
obtaining historical time-dependent environmental data associated with the one or more renewable power sources;
obtaining historical time-dependent operational characteristic data associated with the one or more renewable power sources;
training a machine learning model based on the historical time-dependent environmental data and the historical time-dependent operational characteristic data; and
executing the trained machine learning model to predict available power resources for the one or more industrial gas plants for a pre-determined future time period.

4. The method of claim 1, wherein the time-dependent predicted operational characteristic data is generated from a trained machine learning model for each of the one or more industrial gas plants.

5. The method of claim 4, wherein the time-dependent predicted operational characteristic data for each industrial plant is obtained by:
assigning a machine learning model to each of the one or more industrial gas plants forming the industrial gas plant complex;

training the respective machine learning model for each industrial gas plant based on received historical time-dependent operational characteristic data for the respective industrial gas plant; and executing the trained machine learning model for each industrial gas plant to predict operational characteristics for each respective industrial gas plant for a pre-determined future time period.

6. The method of claim 1, wherein the industrial gas plant complex comprises storage resources comprising one or more industrial gas storage vessels for the hydrogen storage and/or one or more energy storage resources.

7. The method of claim 6, wherein the one or more energy storage resources comprises one or more of: battery energy storage systems; compressed air energy storage; liquid air energy storage; or pumped hydroelectric energy storage.

8. The method of claim 6, wherein the predicted power data further comprises data representative of operational parameters of the one or more storage resources.

9. The method of claim 8, wherein the data representative of operational parameters of the one or more storage resources comprises one or more of:
resource storage availability; fill level; and utilization.

10. A system for controlling an industrial gas plant complex comprising one or more industrial gas plants powered by one or more renewable power sources, the system comprising:

at least one hardware processor operable to perform:
receiving time-dependent predicted power data for a pre-determined future time period from the one or more renewable power sources;
receiving time-dependent predicted operational characteristic data for each industrial gas plant, the time-dependent predicted operational characteristic data including data for:
hydrogen storage for hydrogen output from a hydrogen production plant;
electrolyzer hydrogen produced for the hydrogen production plant;
nitrogen storage for nitrogen storage of an air separation unit (ASU);
and/or
ammonia flow to storage for an ammonia loop of the ammonia production plant; and
utilizing the predicted power data and predicted characteristic data in an optimization model to generate a set of state variables for the one or more industrial gas plants such that the optimization model defines the predicted power data and predicted characteristic data as a set of non-linear equations and the state variables are generated by solving the set of non-linear equations, the one or more industrial gas plants comprising the hydrogen production plant and the ammonia production plant;
utilizing the generated state variables to generate a set of control set points for the one or more industrial gas plants for maximizing ammonia production of an ammonia production plant; and
sending the control set points to a control system to control the industrial gas plant complex by adjusting one or more control set points of the one or more industrial gas plants.

11. The system of claim 10, wherein the time-dependent predicted power data is generated from a trained machine learning model.

12. The system of claim 10, wherein the time-dependent predicted operational characteristic data is generated from a trained machine learning model for each of the one or more industrial gas plants.

13. A non-transitory computer readable storage medium storing a program of instructions executable by a machine to perform controlling of an industrial gas plant complex comprising a one or more industrial gas plants powered by one or more renewable power sources, the method being executed by at least one hardware processor, the method comprising:

receiving time-dependent predicted power data for a pre-determined future time period from the one or more renewable power sources;
receiving time-dependent predicted operational characteristic data for each industrial gas plant, the time-dependent predicted operational characteristic data including data for:
hydrogen storage for hydrogen output from a hydrogen production plant;
electrolyzer hydrogen produced for the hydrogen production plant;
nitrogen storage for nitrogen storage of an air separation unit (ASU); and/or
ammonia flow to storage for an ammonia loop of the ammonia production plant; and
utilizing the predicted power data and predicted characteristic data in an optimization model to generate a set of state variables for the one or more industrial gas plants such that the optimization model defines the predicted power data and predicted characteristic data as a set of non-linear equations and the state variables are generated by solving the set of non-linear equations, the one or more industrial gas plants comprising the hydrogen production plant and the ammonia production plant;
utilizing the generated state variables to generate a set of control set points for the one or more industrial gas plants for maximizing ammonia production of an ammonia production plant of the one or more industrial gas plants; and
sending the control set points to a control system to control the one or more industrial gas plant complex by adjusting one or more control set points of the one or more industrial gas plants.

14. The non-transitory computer readable storage medium of claim 13, wherein the time-dependent predicted power data is generated from a trained machine learning model and/or the time-dependent predicted operational characteristic data is generated from a trained machine learning model for each of the one or more industrial gas plants.

\* \* \* \* \*